Patented Mar. 6, 1923.

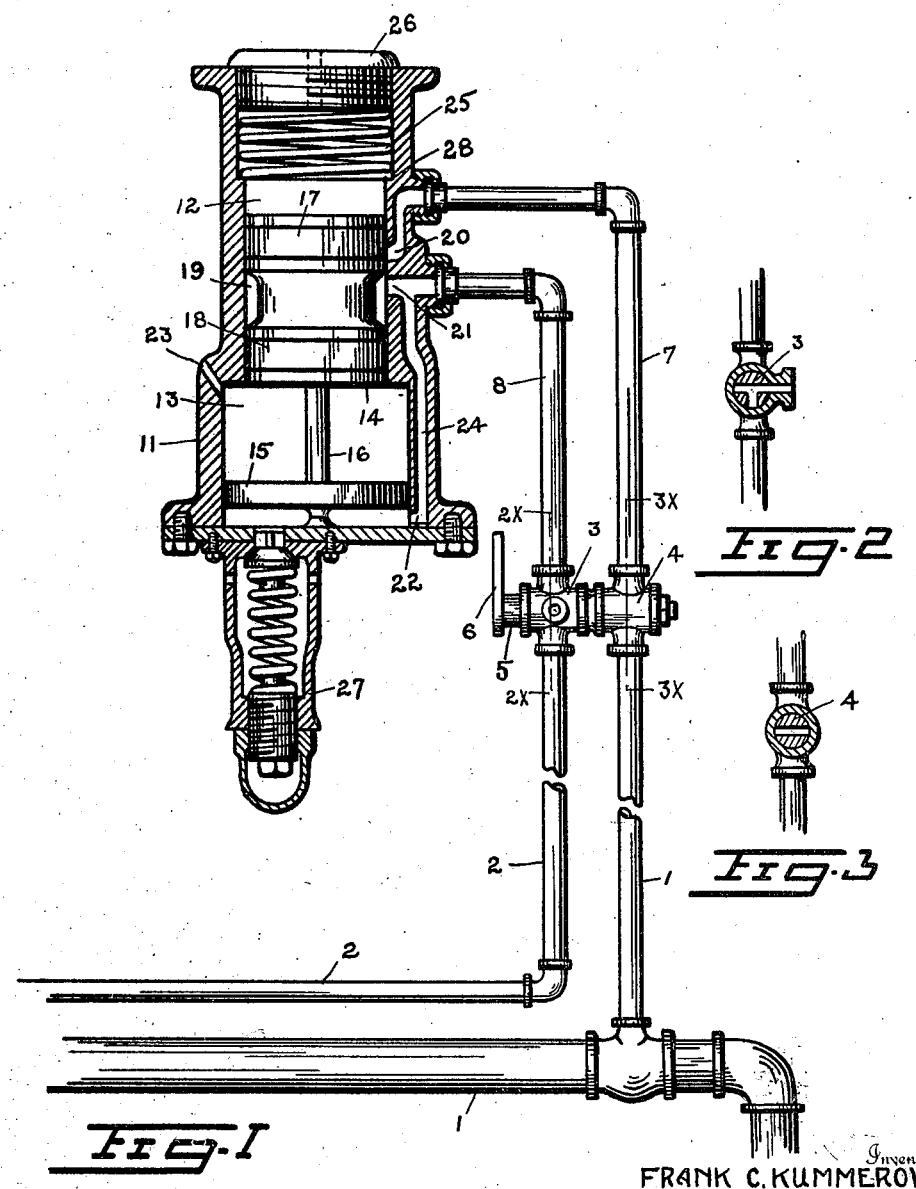

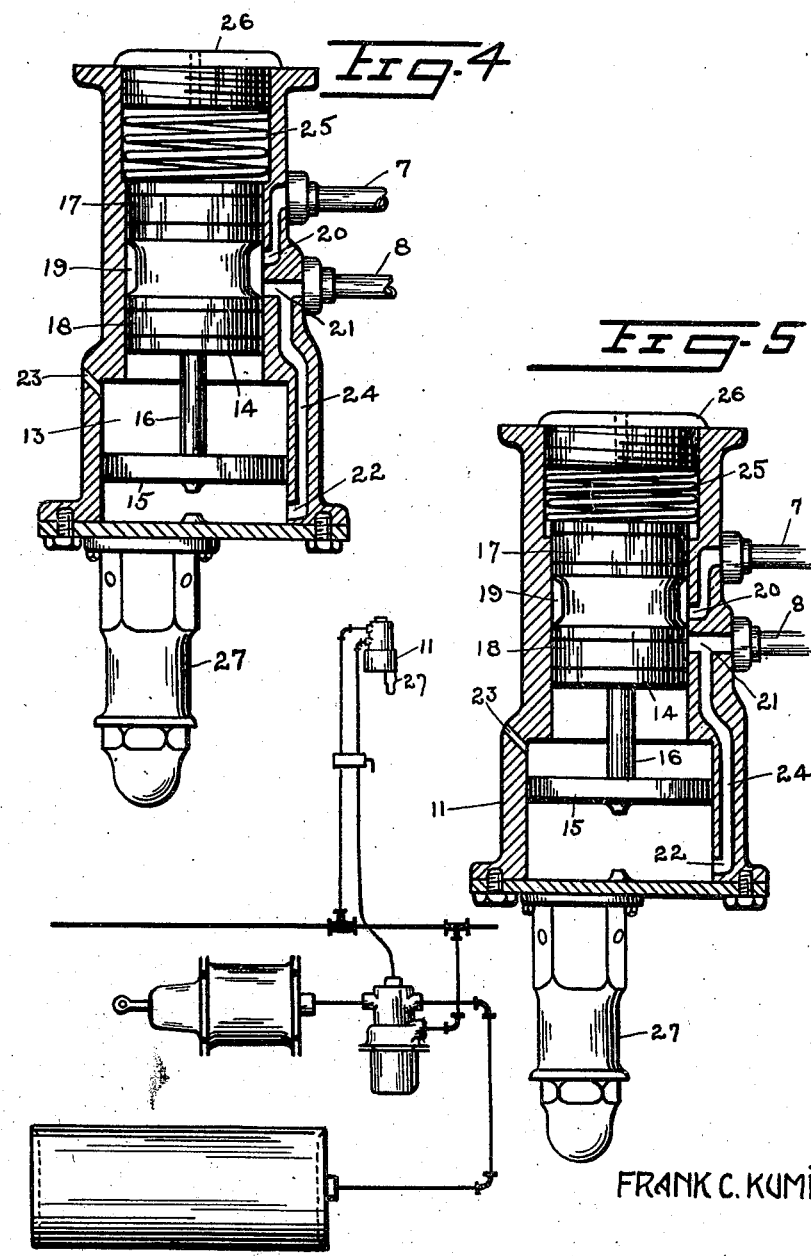

1,447,791

UNITED STATES PATENT OFFICE.

FRANK C. KUMMEROW, OF ATTICA, NEW YORK.

AIR-BRAKE-RETAINING VALVE.

Application filed February 21, 1921. Serial No. 446,886.

*To all whom it may concern:*

Be it known that I, FRANK C. KUMMEROW, a citizen of the United States, residing at Attica, in the county of Wyoming and State of New York, have invented certain new and useful Improvements in Air-Brake-Retaining Valves, of which the following is a specification.

Freight and passenger trains are controlled in speed in going up hill and down and in being brought to a stop by so-called air brakes. These air brakes are operated by compressed air, which air is compressed by a pump on the engine and fed to the train thru a valve in the engineer's cab. The compressed air is stored in an auxiliary reservoir on each car and is admitted to the brake cylinder thru a valve on each car that is ordinarily known as the triple valve. This valve has one movement to admit air to the brake cylinders for the service stop, another movement to admit air to the brake cylinders for the emergency stop, both of which movements are caused by reducing the pressure in the train pipe, and a third movement to release the brakes and charge the auxiliary reservoir, which is caused by raising the pressure in the train pipe. Each time air is admitted to the brake cylinder, the air pressure in the auxiliary reservoir is reduced. In order to raise the pressure in the auxiliary reservoir, the triple valve must be moved and this, in turn, will cause the discharge of the air from the brake cylinder, which will pass into the atmosphere. A considerable interval is required to raise the pressure in all the auxiliary reservoirs to normal thruout the train. If the train is moving down a long hill, it is customary to apply the brakes and release them several times while going down the hill so as to control the speed of the train and if this setting and releasing of the brakes is repeated too often, the air will be drawn from the auxiliary reservoir faster than the pump on the engine can replace it on the whole train. To overcome this difficulty, freight and passenger cars have been equipped with so-called retaining valves which are manually set by the brakemen at the top of a hill while the train is in motion and serve to hold the pressure in the brake cylinder and prevent the release of the brakes when the triple valve is moved to charge the auxiliary reservoir. It frequently happens, however, on cars that the fittings of the retaining valves and of the brake cylinders leak more or less rapidly so that in a few seconds or a few minutes the pressure is reduced in some of the brake cylinders to a point where the brakes will no longer hold and it becomes necessary to again fill all the brake cylinders from the auxiliary reservoirs. If this is repeated too often, because of leakage, the supply of compressed air will be wasted more rapidly than the engine can replace it and then the brakes will fail to work at all and the train will be in danger of being wrecked.

My invention has for its object to overcome this difficulty caused by the waste of air, and has for its object to supply a retaining valve of a new and improved type that will hold the air pressure in the brake cylinders at an uniform pressure and will replace the leakage in each brake cylinder affected as rapidly as it occurs without disturbing the other cylinders, the leakage being replaced directly from the train pipe. In this way, the brakes on a predetermined number of cars will remain permanently set after the first setting of the brakes and the speed of the train will be held uniform and a correspondingly long period will be given for the recharging of the auxiliary reservoirs so that a general application of the brakes thruout the train will not thereafter be necessary at all or will be needed only after much longer intervals, which intervals will be amply long enough to provide for the restoring of the auxiliary reservoirs to their original pressure.

This and other objects of the invention will be fully illustrated in the drawings, described in the specification and pointed out in the claims at the end thereof.

In the drawings,

Fig. 1 is a diagrammatic view of the pipes and retaining valve, the casing of the retaining valve being shown in section with the valve in normal position.

Fig. 2 is a section on the line $2^x$—$2^x$ of Fig. 1.

Fig. 3 is a section on the line $3^x$—$3^x$ of Fig. 1.

Figs. 4 and 5 are sectional views of the retaining valve, the valve being shown in different positions.

Fig. 6 is a diagrammatic view of the brake cylinder, auxiliary reservoir, triple valve and connections to the retaining valve.

In the drawings, reference numeral 1 indicates the train pipe or brake pipe that conveys the high pressure air from the valve in the engineer's cab to the air brake apparatus thruout the train. On each car this pipe 1 is extended to the top of the car. 2 indicates the pipe that takes the exhaust air from the brake cylinder after it passes thru the triple valve to the retaining valve at the top of the car. The pipes 1 and 2 are extended up on the end of the car from the bottom of the car to the top. These pipes run parallel to each other and are controlled by the valves 3 and 4, both of which are formed in and are operated by one valve stem 5, which is operated by the handle 6. The ports of the valve 3 are shown in vertical section in Fig. 2 and the ports of the valve 4 are shown in vertical section in Fig. 3. The pipes 1 and 2 are continued on thru the valves 3 and 4 by means of the pipes 7 and 8. Each of these pipes contains the same pressure that is contained in the pipes 1 and 2 and are separated from each other except as they are connected for the flow of air through the retaining valve at the top of the car, which valve will now be described.

This retaining valve comprises a trunk cylinder 11, having a small bore cylinder 12 therein at the top and a large bore cylinder 13 therein at the bottom. In the cylinder 12 operates the piston 14 of small diameter and in the cylinder 13 operates the piston 15 of large diameter. The pistons 14 and 15 are connected by a stem 16 so that they move together and in this way, the pistons 14 and 15 form a trunk piston or valve. This valve normally rests by gravity at the bottom of the cylinder as shown in Fig. 1. The piston 14 is provided with two heads 17 and 18, separated by an annular recess 19. In the cylinder is provided a port 20 for the high pressure pipe, a port 21 for the exhaust pipe at the top and a port 22 for the exhaust pipe at the bottom. There is also provided a port or opening 23 in the large cylinder thru which the compressed air can escape from between the large piston and the small piston into the outside air. In this way, an accumulation of compressed air in the space enclosed between the two pistons is avoided.

The heads 17 and 18 make a close fit with the small cylinder and the head 15 makes a close fit with the large cylinder and this fit is obtained by a packing of any suitable kind.

The ports 20 and 21 are placed closely together and the port 20 is normally closed by the head 17. When the piston rises, the annular space 19 between the pistons is wide enough to permit the ports 20 and 21 to be uncovered or opened at the same time. The port 21 communicates thru the passage 24 with the port 22 at the bottom of the large cylinder.

The ports 20 and 21 are closed or opened by the piston 14 in a manner that will presently be described. When the valve stem 5 and handle 6 are placed to close the valves 3 and 4, the valves will be placed in the positions shown in Figs. 1, 2 and 3 and the pressure from the train pipe will be shut off from the retaining valve and the valve 3 will be placed so as to permit the exhaust air from the brake cylinder after passing thru the trip valve and thru the pipe 2 to pass thru the valve 3, as shown in Fig. 2, into the atmosphere without going thru or affecting the retaining valve which will remain idle. When the valve stem 5 and handle 6 are turned a quarter turn, the pressure in the pipe 1 is communicated to the pipe 7, in which pipe the pressure is held normally by the normal position of the head 17, as shown in Fig. 1, which is the position the valve takes by gravity and the valve remains in this position when the brakes are first set. When the engineer moves the triple valve to release the brakes, the exhaust air from the brake cylinder flows out thru the triple valve and up thru the pipe 2 and thru the valve 3 into the pipe 8 and the pressure is communicated simultaneously thru the annular space 19 in the valve 14 thru the port 21. As this pressure is balanced by the two piston heads 17 and 18, the valve 14 is not moved thereby. The pressure is also communicated thru the port opening 24 to the under side of the piston 15, causing the piston 15 to rise from the seat and move the valve 14 up against the spring 25, compressing the spring. In so doing, the valve 14 uncovers the port 20 and connects it to the port 21 thru the annular space 19 for an instant only, for this further increases the pressure back of the piston 15 and quickens the travel of the valve 14 until its movement is arrested by the spring 25, which spring is more or less compressed thereby. An initial pressure is put on the spring 25 by the plug 26 sufficient to balance the pressure of 15 lbs. under the piston 15. The spring at its lower end seats on a shoulder 28 in the cylinder, from which it is lifted by the piston 14.

When the piston 14 is at the top of its movement, the lower head 18 closes the port 21, as shown in Fig. 5, and holds the high pressure in the pipe 7 against flowing into the pipe 8. If the pressure back of the piston 15 rises above 20 lbs., it is reduced by the safety valve 27. As the pressure back of the piston 15 falls below 15 lbs. as it will do slowly by brake cylinder leakage, the spring 25 pushes the piston 14 down causing the port 21 to be uncovered so that the high pressure there can flow from the annular space 19 into the port 21. This raises the pressure in the pipe 8 from whence it flows to the valve 3 and into the brake cylinder, holding the brake firmly against the wheel. As the pressure is raised to 15 lbs., the piston 15 is raised, moving the piston 14 to close the port 21, and compress the spring 25 to hold the piston in closing position. In this way, the pressure of the brake cylinder will be maintained properly as long as the valve stem 5 and the valves remain in the position in which they have been placed by the brakeman. When the valve stem 5 is turned to normal position, the pressure in the brake cylinder when the brakes are released by the engineer, is allowed to flow directly into the atmosphere thru the valves placed in the position shown in Fig. 2, and the valve 14 then ceases to function.

I claim:

1. A retaining valve for an air brake, having a cylinder, a piston with two heads therein, ports for low pressure and high pressure connections opened and closed and connected and separated by said piston, a second piston operated by the raising air pressure to move the first named piston to close the port for the high pressure connection on the raising of the pressure in the low pressure pipe and open the port on the lowering of the pressure in the low pressure pipe.

2. A retaining valve having a cylinder, a piston therein with an upper an lower head thereon, separated by a recess, two port openings in said cylinder, one above the other, the upper head being adapted to close the upper opening when the piston is in its lowest position and the lower head being adapted to close the lower opening when the piston is in its upper position, the recess between the heads being adapted to connect the port openings when the piston is in mid-position.

3. A retaining valve having a cylinder, a piston therein with an upper and lower head thereon, separated by a recess, two port openings in said cylinder, one above the other, the upper head being adapted to close the upper opening when the piston is in its lowest position and the lower head being adapted to close the lower opening when the piston is in its upper position, the recess between the heads being adapted to connect the port openings when the piston is in mid-position, a second piston connected to said first named piston on one side and being adapted to move the first named piston to open and close said port openings.

4. A retaining valve having a cylinder, a piston therein with an upper and lower head thereon, separated by a recess, two port openings in said cylinder, one above the other, the upper head being adapted to close the upper opening when the piston is in its lowest position and the lower head being adapted to close the lower opening when the piston is in its upper position, the recess between the heads being adapted to connect the port openings when the piston is in mid-position, a second piston connected to said first named piston on one side and being adapted to move the first named piston to open and close said port openings, a spring on the other side of said first named piston adapted to limit the movement of the first named piston in one direction and move it in the other direction.

5. A retaining valve having a cylinder, a piston therein with an upper and lower head thereon, separated by a recess, two port openings in said cylinder, one above the other, the upper head being adapted to close the upper opening when the piston is in its lowest position and the lower head being adapted to close the lower opening when the piston is in its upper position, the recess between the heads being adapted to connect the port openings when the piston is in mid-position, a second piston connected to said first named piston on one side and being adapted to move the first named piston to open and close said port openings, a spring on the other side of said first named piston, adapted to limit the movement of the first named piston in one direction and move it in the other direction, means for increasing and decreasing the initial pressure on said spring.

6. A retaining valve, having a cylinder, a piston therein with an upper and lower head thereon, separated by a recess, two port openings in said cylinder, one above the other, said heads being adapted to close said port openings, one at a time, a high pressure pipe connected to one opening, a low pressure pipe connected to the other opening, valves in each of said pipes to open and close said pipes.

7. A retaining valve, having a cylinder, a piston therein with an upper and lower head thereon, separated by a recess, two port openings in said cylinder, one above the other, said heads being adapted to close said port openings, one at a time, a high pressure pipe connected to one opening, a low pressure pipe connected to the other opening, valves in each of said pipes to open and close said pipes, said valves being on a single stem and being adapted to open and close simultaneously.

In testimony whereof I affix my signature.

FRANK C. KUMMEROW.